(12) United States Patent
Grossman et al.

(10) Patent No.: US 7,899,134 B2
(45) Date of Patent: Mar. 1, 2011

(54) DYNAMIC DEMODULATOR SELECTION BASED ON CHANNEL QUALITY

(75) Inventors: Nathaniel Lev Grossman, Los Gatos, CA (US); Gokhan Mergen, Campbell, CA (US); Nitin Kasturi, Los Gatos, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1038 days.

(21) Appl. No.: 11/679,285

(22) Filed: Feb. 27, 2007

(65) Prior Publication Data

US 2008/0075147 A1    Mar. 27, 2008

Related U.S. Application Data

(60) Provisional application No. 60/847,191, filed on Sep. 26, 2006.

(51) Int. Cl.
*H03K 9/00* (2006.01)
*H04L 27/00* (2006.01)

(52) U.S. Cl. ............ 375/316; 375/324; 375/325; 375/340; 329/315; 329/316; 329/317; 327/348

(58) Field of Classification Search .......... 375/316, 375/324, 325, 340; 329/315–317, 348
See application file for complete search history.

(56) References Cited

U.S. PATENT DOCUMENTS

| | | | | |
|---|---|---|---|---|
| 5,214,391 A | * | 5/1993 | Serizawa et al. | 329/316 |
| 5,530,913 A | * | 6/1996 | Scholefield | 455/450 |
| 6,259,721 B1 | * | 7/2001 | Uesugi et al. | 375/130 |
| 2002/0172166 A1 | * | 11/2002 | Arslan et al. | 370/317 |
| 2004/0042537 A1 | | 3/2004 | Frank | |
| 2004/0240531 A1 | * | 12/2004 | Black et al. | 375/148 |

FOREIGN PATENT DOCUMENTS

EP    1473853    11/2004

OTHER PUBLICATIONS

International Search Report—PCT/US07/079580, International Search Authority—European Patent Office—Mar. 3, 2008.

* cited by examiner

*Primary Examiner*—Curtis B Odom
(74) *Attorney, Agent, or Firm*—Stanton Braden; Kevin T. Cheatham

(57) ABSTRACT

In general, this disclosure describes techniques for demodulating wireless signals. In particular, the techniques of this disclosure dynamically select between two or more demodulators based on channel quality information measured over a plurality of measurement periods. For example, a wireless communication device (WCD) may switch from a first demodulator to a second demodulator when the channel quality information associated with the demodulators indicates a better channel quality for the second demodulator than the first demodulator for a consecutive number of measurement periods. As another example, the WCD may compute, for each measurement period, the difference between the channel quality information associated with each of the demodulators, sum the differences, and switch demodulators when the total accumulation of the differences exceeds a threshold.

49 Claims, 5 Drawing Sheets

DYNAMIC DEMODULATOR SELECTION BASED ON CHANNEL QUALITY

This application claims the benefit of U.S. Provisional Application No. 60/847,191, filed Sep. 26, 2006, the entire content of which is incorporated herein by reference.

TECHNICAL FIELD

This disclosure relates to wireless communication and, more particularly, to demodulation of wireless signals.

BACKGROUND

A wide variety of wireless communication techniques have been developed to facilitate wireless telecommunication. The wireless communication techniques include code division multiple access (CDMA), frequency division multiple access (FDMA), time division multiple access (TDMA), and orthogonal frequency division multiplexing (OFDM). The above wireless communication techniques may be delivered according to any of a variety of radio access technologies, such as Global System for Mobile Communications (GSM), CDMA 2000, wideband CDMA (W-CDMA), CDMA 1xEV-DO, or the like. Another broad family of standards developed to facilitate wireless networking are the protocols defined by the various IEEE 801.11x standards.

Some example wireless communication devices that communicate using these techniques include cellular or satellite radiotelephones, radiotelephone base stations, computers that support one or more wireless networking standards, wireless access points for wireless networking, PCMCIA cards incorporated within portable computers, direct two-way communication devices, personal digital assistants (PDAs) equipped with wireless communication capabilities, and the like.

In wireless telecommunication, information is modulated to create one or more baseband waveforms, also referred to as baseband signals. The baseband waveforms may then be mixed with an electromagnetic carrier wave, which is sometimes referred to as an up-conversion process. The up-converted waveform produced by mixing the carrier wave with the modulated baseband waveform can be wirelessly transmitted to a receiving device, e.g., in accordance with one of the communication techniques described above. The receiving device mixes the baseband waveform from the received carrier wave with an intermediate frequency signal, which is sometimes referred to as a down-conversion process. Demodulation of the resulting down-converted baseband waveform can then be performed by the receiving device to obtain the modulated information.

SUMMARY

In general, this disclosure describes techniques for demodulating wireless signals. In particular, the techniques of this disclosure dynamically select between two or more demodulators based on channel quality information measured over a plurality of measurement periods. For example, a wireless communication device (WCD) may switch from a first demodulator to a second demodulator when the channel quality information associated with the demodulators indicates that the second demodulator has a better channel quality than the first demodulator for a consecutive number of measurement periods. As another example, the WCD may compute, for each measurement period, the difference between the channel quality information associated with each of the demodulators, sum the differences, and switch demodulators when the total accumulation of the differences exceeds a threshold.

In one aspect, a method comprises analyzing multiple quality metrics associated with each of a plurality of demodulators to determine which of the demodulators is operating with better performance characteristics, selecting the one of the demodulators that is operating with better performance characteristics, and demodulating incoming signals with the selected demodulator.

In another aspect, a device comprises a plurality of demodulators and a demodulator selection module that analyzes multiple quality metrics associated with each of the plurality of demodulators to determine which of the demodulators is operating with better performance characteristics and selects the one of the demodulators that is operating with better performance characteristics to demodulate incoming signals.

In a further aspect, a computer program product comprises a computer-readable medium comprising codes for causing at least one computer to analyze multiple quality metrics associated with each of a plurality of demodulators to determine which of the demodulators is operating with better performance characteristics select the one of the demodulators that is operating with better performance characteristics, and demodulate incoming signals with the selected demodulator.

In yet another aspect, a device comprises means for analyzing multiple quality metrics associated with each of a plurality of demodulators to determine which of the demodulators is operating with better performance characteristics means for selecting the one of the demodulators that is operating with better performance characteristics, and means for demodulating incoming signals with the selected demodulator.

The techniques described in this disclosure may be implemented in hardware, software, firmware, or any combination thereof. If implemented in software, the software may be executed in a computer. The software may be initially stored as instructions, program code, or the like. Accordingly, the disclosure also contemplates a computer program product comprising a computer-readable medium, wherein the computer-readable medium comprises instructions for causing a computer to execute techniques and functions in accordance with this disclosure.

The details of one or more aspects of the disclosure are set forth in the accompanying drawings and the description below. Other features, objects, and advantages of this disclosure will be apparent from the description and drawings, and from the claims.

DETAILED DESCRIPTION

Figure 1:
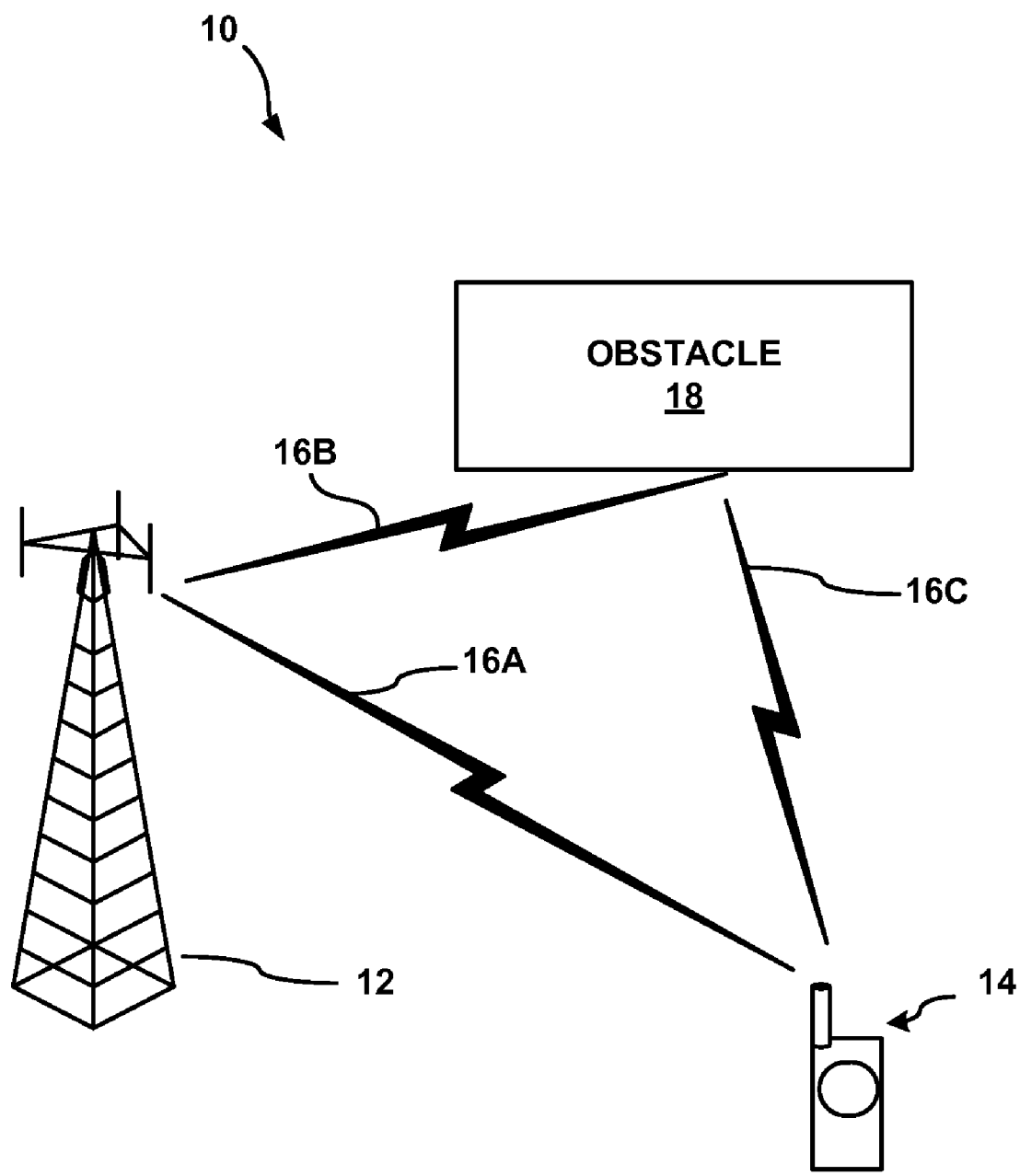
FIG. 1 is a block diagram illustrating an exemplary wireless communication system.

In general, this disclosure describes techniques for demodulating wireless signals. In particular, the techniques of this disclosure dynamically select between two or more demodulators based on channel quality information associated with the demodulators. In selecting between two or more demodulators, it is desirable to select whichever one of the demodulators has the best performance characteristics.

A wireless communication device (WCD) may be configured to dynamically switch between the demodulators based on analysis of multiple quality metrics associated with each of demodulators. In one aspect of this disclosure, the WCD may be configured to dynamically switch between the demodulators based on analysis of multiple types of quality metrics associated with each of the plurality of demodulators. In another aspect, the WCD may be configured to dynamically switch between the demodulators based on analysis of multiple quality metrics taken measured for each of demodulators over a plurality of measurement periods. That is, this invention need not merely look at the most recently taken data point (or piece of information) about the quality metric; it can look at the history of samples of the quality metric over the past. In other words, the WCD bases its switching decisions on analysis of multiple quality metrics measured by the demodulators over a period of time, using the heuristic that the demodulator that observes the best performance characteristics over that period of time is the demodulator which is best adapted for demodulation under the current conditions, and therefore delivers the highest data rate. As used herein, the term "quality metric" refers to measurements of information that how well the demodulators are performing or how good the transmission environment associated with respective demodulators is. The quality metrics may include, for example, measurements of a signal-to-noise ratio (SNR), SNR plus a calibration constant, a received signal strength indicator (RSSI), a carrier-to-interference plus noise ratio (CINR), or other a channel quality indicator (CQI), or a bit-error rate (BER), block level error rate (BLER), data rate (or throughput), or any other indication of suitable quality metric.

For example, the WCD may switch from a first demodulator to a second demodulator when the quality metrics associated with the demodulators indicates that the second demodulator has better performance characteristics than the first demodulator for a consecutive number of measurement periods. In this manner, the WCD switches from the first demodulator to the second demodulator when the quality metrics associated with the second demodulator indicate better performance characteristics for the second demodulator than the quality metrics associated with the first demodulator for a consecutive number of quality metrics. As another example, the WCD may compute, for each measurement period, a difference between the quality metrics associated with each of the demodulators, sum the differences, and switch demodulators when the total accumulation of the differences exceeds a threshold. In this manner, the WCD switches demodulators based on computed differences between each of the CQIs associated with the first demodulator and corresponding ones of the CQIs associated with the second demodulator.

In addition to switching between the demodulators based on quality metrics measured for each of demodulators over a plurality of measurement periods, the WCD may also be configurable to switch between demodulators based on quality metrics associated with the demodulators over a single measurement period, e.g., the previous measurement period. For example, the WCD may switch to the demodulator that observed the best performance characteristics the previous measurement period. In this manner, the WCD may be configurable to operate in several different switching modes, such as a first switching mode that switches between the demodulators based on channel quality history over a plurality of measurement periods and a second switching mode that switches between the demodulators based on channel quality over a single measurement period.

FIG. 1 is a block diagram illustrating an exemplary wireless communication system 10. Wireless communication system 10 includes a base station 12 that transmits and receives wireless communication signals to and from a WCD 14. The wireless signals may follow one or more paths 16A-16C (collectively, "paths 16") through a radio-frequency (RF) environment. The signals are subject to varying channel conditions present within the RF environment between base station 12 and WCD 14. For example, channel conditions may include signal fading, interference and delay that result in weak signal strength or noise.

System 10 may be designed to support one or more wireless communication technologies such as code division multiple access (CDMA), frequency division multiple access (FDMA), time division multiple access (TDMA), or orthogonal frequency division multiplexing (OFDM). The above wireless communication technologies may be delivered according to any of a variety of radio access technologies, such as Global System for Mobile Communications (GSM), CDMA 2000, wideband CDMA (W-CDMA), CDMA 1xEV-DO, or the like. Alternatively, or additionally, base station 12 and WCD 14 may be equipped to communicate according to a wireless local area network (WLAN) protocol, such as any of the protocols defined by the various IEEE 801.11x standards.

WCD 14 may take the form of a cellular telephone, a satellite telephone, a radio telephone, a personal digital assistant (PDA), a wireless communication card incorporated within a portable computer, a wireless gaming device or any other device incorporating wireless communication capabilities. Base station 12 may include a base station controller (not shown) that provides an interface between base station 12 and a global packet-based core network such as the Internet, a wide area network (WAN), or a local area network (LAN), and/or the public switched telephone network (PSTN).

As described above, wireless signals transmitted by base station 12 may follow one or more of paths 16 through a radio-frequency (RF) environment. WCD 14 may, for example, receive signals from base station 12 via a first path 16A, as well as signals via a second path 16B, 16C caused by reflection of the signal from an obstacle 18. Obstacle 18 may be any structure proximate to WCD 14 such as a building, bridge, car, or even a person. The transmitted signals illustrate a multi-path environment in which multiple received signals carry the same information, but may have different amplitudes, phases and time delays.

WCD 14 processes the received signal using a number of processing techniques, such as down-conversion, demodulation, and decoding, to extract the information contained in the signal. In accordance with the techniques described in this disclosure, WCD 14 dynamically switches between two or more demodulators (not shown in FIG. 1) based on quality metrics associated with each of the demodulators. The quality metrics associated with each of the demodulators may indicate how well the demodulators are performing or how good the transmission environment associated with respective demodulators is. As an example, the quality metrics may include measurements of one or more channel quality indicators (CQIs). Although this disclosure describes switching between demodulators based on one or more channel quality indicators, the techniques may be utilized to switch between demodulators in accordance with analysis of other quality metrics associated with the demodulators.

WCD 14 may be configured to dynamically switch between the demodulators based on analysis of multiple quality metrics associated with each of the demodulators. WCD 14 may analyze the quality metrics in real-time, i.e., as the measurements are made, or in non real-time, e.g., off-line. In one aspect, WCD 14 may be configured to dynamically switch between the demodulators based on analysis of multiple types of quality metrics associated with each of the plurality of demodulators. In another aspect, WCD 14 may be configured to dynamically switch between the demodulators based on one or more CQIs measured for each of the demodulators over a plurality of measurement periods. In other words, WCD 14 dynamically switches between demodulators based on an analysis of multiple samples of the same type of quality metric associated with each of the demodulators. Thus, WCD 14 bases its switching decisions on the channel quality (or other performance characteristic) observed by the demodulators over a period of time, using the heuristic that the demodulator that observes the best channel quality over that period of time is the demodulator which is best adapted for demodulation under the current channel conditions, and therefore delivers the highest data rate.

For example, WCD 14 may switch from a first demodulator to a second demodulator when the CQIs associated with the demodulators indicate that the second demodulator has a better channel quality for a consecutive number of measurement periods. In this manner, WCD 14 may switch from the first demodulator to the second demodulator when the CQIs associated with the second demodulator indicate a better channel quality for the second demodulator than the CQIs associated with the first demodulator for a consecutive number of CQIs.

As another example, WCD 14 may compute, for each measurement period, the difference between CQIs associated with each of the demodulators and switch demodulators when the summation of the differences exceeds a threshold. Thus, WCD 14 may switch demodulators based on computed differences between each of the CQIs associated with the first demodulator and corresponding ones of the CQIs associated with the second demodulator. Likewise, WCD 14 may switch demodulators based on a moving average of the quality metrics over a period of time, which may be particularly useful when switching between more than two demodulators.

Additionally, WCD 14 may also be configurable to switch between demodulators based on CQIs measured over a single measurement period, e.g., the previous measurement period. In particular, WCD 14 may switch to the one of the demodulators for which the best channel quality was observed during the previous measurement period. For example, WCD 14 may switch between the first demodulator and the second demodulator based on analysis of one CQI associated with the first demodulator and a corresponding CQI associated with the second demodulator. In another example, WCD 14 may switch between the first demodulator and the second demodulator based on analysis of multiple types of quality metrics observed over a single measurement period. WCD 14 may thus be configurable to operate in several different switching modes, such as a first switching mode that switches between the demodulators based on channel quality information measured over a plurality of measurement periods and a second switching mode that switches between the demodulators based on channel quality information measured over a single measurement period. WCD 14 may be configured by a manufacturer to operate in accordance with one of the switching modes or by an operator of WCD 14. Alternatively, WCD 14 may dynamically select between the different switching modes.

It should be apparent that the teachings herein may be embodied in a wide variety of forms and that any specific structure and/or function disclosed herein is merely representative. For example, WCD 14 may be configured to utilize quality metrics other than CQIs. Based on this disclosure, one skilled in the art will appreciate that an aspect disclosed herein may be implemented independently of any other aspects and that two or more of these aspects may be combined in various ways. For example, a device may be implemented and/or a method practiced using any number of the aspects set forth herein.

Figure 2:
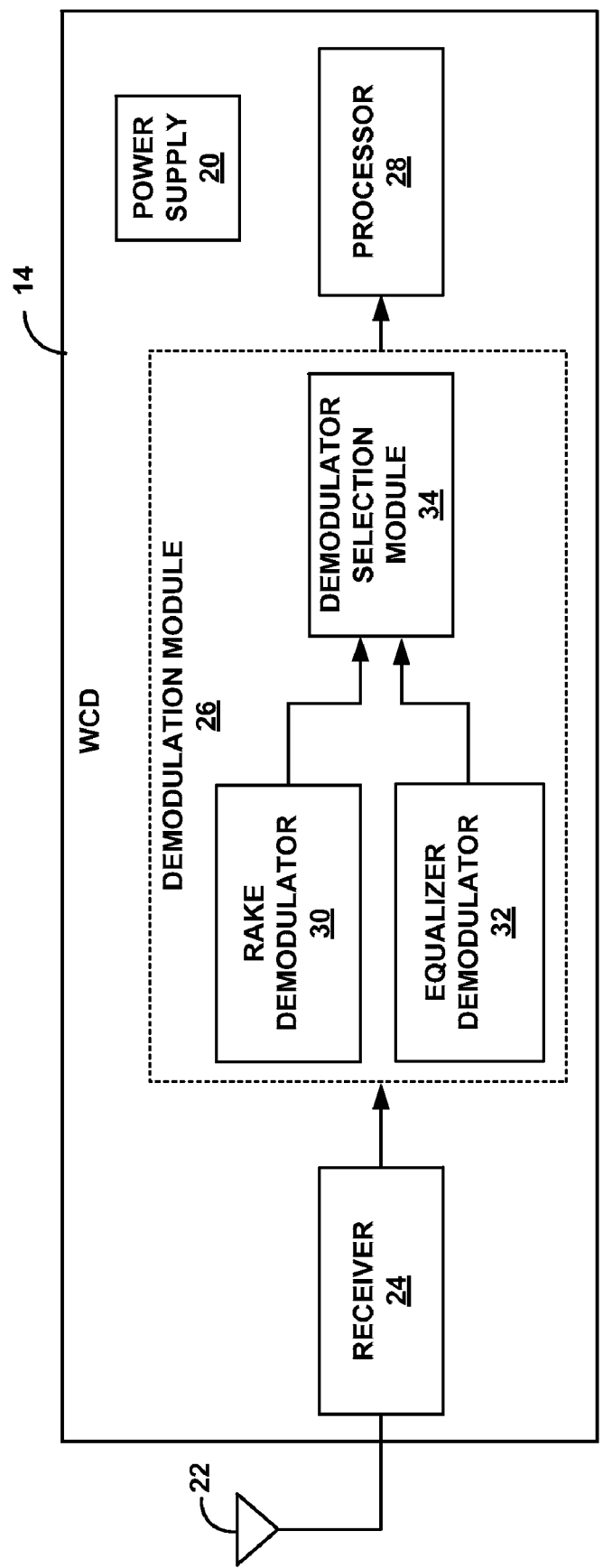
FIG. 2 is a block diagram illustrating an exemplary wireless communication device that dynamically switches between two or more demodulators based on a channel quality associated with each of the demodulators in accordance with this disclosure.

FIG. 2 is a block diagram illustrating an example WCD, such as WCD 14 of FIG. 1, that dynamically switches between two or more demodulators based on channel quality information associated with each of the demodulators. As shown in FIG. 2, WCD 14 includes a power supply 20, an antenna 22, a receiver 24, a demodulation module 26 and a processor 28. Power supply 20 may, for example, be a battery or other portable power source. The techniques described herein, however, may be applicable to WCDs that are not battery-powered, and may be applicable to mobile or stationary WCDs. As described above, WCD 14 may take the form of a variety of wireless equipment, such as a cellular telephone, a satellite telephone, a radio telephone, a personal digital assistant (PDA), a wireless communication card incorporated within a portable computer or any other device incorporating wireless communication capabilities.

In operation, antenna 22 and receiver 24 receive wireless signals on radio frequency bands supported by WCD 14. Receiver 24 may include appropriate analog and/or digital circuit components such as, for example, amplifiers, filters, frequency converters, analog-to-digital conversion circuitry, and the like. Receiver 24 may be configured to support any desired radio access technology (RAT) or any WLAN protocol.

Demodulation module 26 demodulates the received signal in accordance with the techniques of this disclosure. As described in further detail below, demodulation module 26 dynamically selects between two or more demodulators based on channel quality information associated with each of the demodulators. Demodulation module 26 demodulates the received signal using the selected demodulator and passes the demodulated signal to processor 28 for further processing.

In the example illustrated in FIG. 2, demodulation module 26 includes a RAKE demodulator 30, an equalizer demodulator 32, and a demodulator selection module 34. Although in the example illustrated in FIG. 2, demodulation module 26 includes only two demodulators, i.e., RAKE demodulator 30 and equalizer demodulator 32, demodulation module 26 may include more than two demodulators. Moreover, FIG. 2 illustrates RAKE demodulator 30 and equalizer demodulator 32 for purposes of illustration. Demodulation module 40 may include other types of demodulators.

RAKE demodulator 30 may include several correlators (not shown), often referred to as "fingers," that individually process several signal multi-path components. As described above, the wireless signal transmitted by base station 12 (FIG. 1) may follow multiple paths 16 to WCD 14. Referring to FIG. 1, the transmitted signal may follow a first path 16A directly from base station 12 to WCD 14, and also follow a second path along 16B, 16C caused by reflection of the signal from obstacle 18. The different paths followed by the transmitted signal may introduce different time delays as well as noise relative to the other paths of the multi-path signal.

The plurality of fingers of RAKE demodulator 30 extract the same signal at a number of different time delays. By defining the RAKE fingers at different time delays, RAKE demodulator 30 can extract multiple instances of the same signal and select the strongest path for demodulation, or combine multiple paths to define a signal for demodulation. For example, RAKE demodulator 30 may apply equal-gain combining or maximal ratio combining to produce output data based on the received signal.

Equalizer demodulator 32 is typically implemented at the receive device to mitigate Inter-Symbol Interference (ISI) caused by receiving multiple echoes of the sent signal. The filtering that occurs at equalizer demodulator 32 typically changes over time, as channel noise changes. Equalizer demodulator 32 may, for example, comprise a zero forcing equalizer (ZFE), a linear minimum mean square error (LMMSE) equalizer or the like.

RAKE demodulator 30 and equalizer demodulator 32 may measure one or more quality metrics that indicate the performance characteristics observed by the respective demodulators 30, 32. RAKE demodulator 30 and equalizer demodulator 32 may, for example, measure one or more CQIs that indicate the channel quality observed by the respective demodulators 30, 32. In particular, RAKE demodulator 30 and equalizer demodulator 32 may measure CQIs that indicate signal strength of the channel. The better the signal strength, the higher the quality of the channel. As an example, RAKE demodulator 30 and equalizer demodulator 32 may measure a signal-to-noise ratio (SNR), a received signal strength indicator (RSSI), a carrier-to-interference plus noise ratio (CINR), or a bit-error rate (BER) to detect the quality of the channel of the received signal or any other quality metric that indicative of the quality of the transmission environment. Alternatively or additionally, demodulators 30, 32 may measure quality metrics that indicate other performance characteristics, such as data rate or throughput. In some aspects, one or more of the other components within WCD 14 may measure the quality metrics and provide the quality metrics to demodulation module 26. Again, for purposes of explanation, the techniques will be described in the context of analyzing CQIs.

Demodulator selection module 34 dynamically switches between RAKE demodulator 30 and equalizer demodulator 32 based on the channel quality information associated with the demodulators 30, 32. Demodulator selection module 34 may select between the demodulators based on analysis the quality metrics in real-time, i.e., as the measurements are made, or in non real-time, e.g., off-line. In some aspects, demodulator selection module 34 may be configured to switch between RAKE demodulator 30 and equalizer demodulator 32 based on CQIs measured over a plurality of measurement periods. In other words, demodulator selection module 34 bases its switching decision on the channel quality observed by the two demodulators 30, 32 over a period of time, using the heuristic that the demodulator that observes the best channel quality over that period of time is the demodulator which is best adapted for demodulation under the current channel conditions.

As an example, demodulator selection module 34 may switch from a currently selected demodulator, e.g., RAKE demodulator 30, to an unselected demodulator, e.g., equalizer demodulator 32, when the CQIs associated with the demodulators indicate that the unselected demodulator has a better channel quality than the selected demodulator for a consecutive number of measurement periods. For example, demodulator selection module 34 may switch from the selected demodulator to the unselected demodulator when a SNR associated with the unselected demodulator is greater than a SNR associated with the selected demodulator for a five consecutive measurement periods.

Alternatively, demodulator selection module 34 may switch from the selected demodulator to the unselected demodulator when the CQI associated with the demodulators indicates that the unselected demodulator has a better channel quality than the selected demodulator for a particular percentage of the previous measurement periods. For example, demodulator selection module 34 may switch from the selected demodulator to the unselected demodulator when an RSSI associated with the unselected demodulator is greater than the RSSI associated with the selected demodulator for seven of the last ten measurement periods, i.e., seventy percent of the previous measurement periods.

In another aspect of this disclosure, demodulator selection module 34 may compute, for each measurement period, a difference between CQIs associated with each of the demodulators 30, 32 and switch demodulators when a summation of the differences exceeds a threshold. Demodulator selection module 34 may, for example, compute a difference between a CQI associated with the unselected demodulator and a CQI associated with the selected demodulator during each measurement period and sum the computed differences to obtain a total channel quality difference. In this manner, demodulator selection module 34 may make a switching decision based on a moving average of the CQIs over the recent past.

As another example, demodulator selection module 34 may make its selection based on moving averages of one or more quality metrics over the recent past or a weighted average of the moving averages over the recent past. Demodulator selection module 34 may compute a weighted average of the moving averages of the quality metrics, and select the demodulator with the highest weighted average. For example, demodulator selection module 34 may select the demodulator whose sum $$w_{SNR} \frac{\sum_{i=1}^{N_{SNR}} SNR_i}{N_{SNR}} + w_{BLER} \frac{\sum_{i=1}^{N_{BLER}} BLER_i}{N_{BLER}} + w_{throughput} \frac{\sum_{i=1}^{N_{throughput}} throughput_i}{N_{throughput}}$$

is the highest of all the demodulators under consideration, where $$\frac{\sum_{i=1}^{N_{SNR}} SNR_i}{N_{SNR}}$$

is the moving average of the SNR, $$\frac{\sum_{i=1}^{N_{BLER}} BLER_i}{N_{BLER}}$$

is the moving average of the BLER, $$\frac{\sum_{i=1}^{N_{throughput}} throughput_i}{N_{throughput}}$$

is the moving average of the throughput for the, $w_{SNR}$ is the weight given to the SNR, $w_{BLER}$ is the weight given to the BLER, $w_{throughput}$ is the weight given to the throughput. In this manner, demodulator selection module 34 considers a number of quality metrics over the period of time. This technique is especially useful when demodulator selection module 34 is selecting between more than two demodulators. In that case, demodulator selection module 34 computes the weighted average of the moving averages for each of the demodulators. In another example, demodulator selection module may form the weighted average of filtered, rather than averaged, values of the quality metrics, and then select the demodulator with the highest weighted average filtered quality metric. Finite Impulse Response (FIR) or Infinite Impulse Response (IIR) filters could be used for this purpose.

When the CQI associated with the unselected demodulator is greater than the CQI associated with the selected demodulator, the computed difference is a positive value. Therefore, the value of the accumulated difference increases when the unselected demodulator has a better channel quality than the selected demodulator. When the CQI associated with the unselected demodulator is less than the CQI associated with the selected demodulator, the computed difference is a negative value. Thus, the value of the accumulated difference decreases when the selected demodulator has a better channel quality than the unselected demodulator. Upon the accumulated difference exceeding the threshold, which indicates that the unselected demodulator has had a better channel quality over the multiple measurement periods, demodulator selection module 34 switches demodulators.

In addition to selecting demodulators based on CQIs associated with the demodulators over a plurality of measurement periods, demodulator selection module 34 may also be configurable to select between RAKE demodulator 30 and equalizer demodulator 32 based on CQIs measured over a single measurement period. Thus, demodulator selection module 34 may switch to whichever one of demodulators 30, 32 observed the best channel quality on the previous measurement period to demodulate the received signal during the next measurement period. Demodulator selection module 34 may, for example, analyze one or more quality metrics for the previous measurement period. If demodulator selection module 34 analyzes more than one type of quality metric, demodulator selection module 34 may assign weights or priorities to the quality metrics to assist in determining which of the combinations of quality metrics indicate better performance characteristics.

In this manner, demodulator selection module 34 may be configurable to operate in one of several different demodulator switching modes. In particular, demodulator selection module 34 may be configurable to operate in a first demodulator switching mode that switches between the demodulators based on channel quality information measured over a plurality of measurement periods or a second demodulator switching mode that switches between the demodulators based on channel quality information measured over a single measurement period.

Regardless of the demodulator switching mode of demodulator selection module 34, demodulation selection module 46 may wait for a particular period of time after switching demodulators before allowing another switch. There may be a cost to switching between the different demodulators in the form of lost or missed data. To control the frequency of switching between demodulators 30, 32, demodulator selection module 34 may initialize a counter upon switching demodulators and not allow another switch until the counter expires. The counter, in effect, enforces a lockout period during which demodulator selection module 34 is not allowed switch demodulators. The lockout period may, for example, expand over one or more measurement periods. In some cases, demodulator selection module 34 may not even start analyzing the CQIs associated with demodulators 30, 32 until the counter has expired.

The following pseudo code represents an exemplary demodulator selection algorithm for switching between demodulators in accordance with the techniques of this disclosure. As will be described in detail below, the variables of the pseudo code may be selected to configure demodulator selection module 34 to operate in any one of the three demodulator switching modes.

```
if (EQdisable) {
    DFRONTmode = 0; // DFRONTmode = 0 for RAKE, 1 for EQ
}
else if (RAKEdisable) {
    DFRONTmode = 1;
}
else{
    if (CNTR > 0) {
        CNTR--;
    }
    else {
        if (DFRONTmode = 1) { // in EQ mode
            DELTA = CQIRAKE - CQIeq; // where CQIRAKE,
        CQIeq are quantized
        }
        else { // in RAKE mode
            DELTA = CQIeq - CQIRAKE;
        }
        if (DELTA > DELTAmax) DELTA = DELTAmax;
        // where DELTAmax = 1, 2, ...
        if (DELTA > DELTAmin) DELTA = DELTAmin;
        // where DELTAmin = -DELTAmax
        if (DELTA > 0) {
            ACCUM = ACCUM + DELTA;
        }
        if (DELTA < 0) {
            ACCUM(n) = (ACCUM(n-1) + DELTA) * UPDATEmode;
// where UPDATEmode = 0, 1
        }
        if (ACCUM(n) < -THRESH) {
            ACCUM(n) = -THRESH;
        if (ACCUM(n) > THRESH) {
            SWITCH = 1;
            ACCUM(n) = 0;
            CNTR = CNTRmax;
            DFRONTmode = ~DFRONTmode;
        }
        else {
            SWITCH = 0;
        }
    }
}
```

In the above pseudo code, demodulator selection module 34 determines whether an EQdisable signal is asserted. If demodulator selection module 34 determines that the EQdisable signal is asserted, demodulator selection module sets DFRONTmode to zero. The variable DFRONTmode indicates which of demodulators 30, 32 is currently selected, i.e., currently used by demodulation module 26 for demodulation. When DFRONTmode is equal to zero, RAKE demodulator 30 is selected. When DFRONTmode is equal to one, equalizer demodulator 32 is selected. Thus, when EQdisable is asserted, DFRONTmode is set to zero and demodulator selection module 34 either continues to operate using RAKE demodulator 30 or switches to RAKE demodulator 30.

An EQdisable signal disables equalizer demodulator 32, thus ensuring that RAKE demodulator 30 is used for demodulation. The EQdisable signal may be used, for example, to ensure that RAKE demodulator 30 is used during compressed mode, e.g., a mode in wideband-CDMA in which the data is sent from the network to WCD 14 in less time than in normal operation. This means that the WCD 14 does not need to spend 100% of its time demodulating the data sent from the network. WCD 14 may spend its free time searching for signals from other networks or on other frequencies. This is used, for example, to initiate a switch from a W-CDMA network to a GSM network.

When no EQdisable signal is asserted, demodulator selection module 34 determines whether a RAKEdisable signal is asserted. When a RAKEdisable signal is asserted, demodulator selection module 34 sets DFRONTmode to one and demodulator selection module 34 either continues to operate using equalizer demodulator 32 or switches from RAKE demodulator 30 to equalizer demodulator 32. As an example, RAKEdisable may be asserted to ensure that demodulation module 26 operates using equalizer demodulator 32 for testing purposes.

If neither EQdisable nor RAKEdisable are asserted, demodulation selection module 46 determines whether a count down counter (CNTR) is greater than zero. CNTR is used to control the frequency of switching between demodulators 30, 32. If demodulation selection module 46 determines that CNTR is greater than zero, CNTR is decremented. Demodulation selection module 46 continues to monitor CNTR until CNTR is equal to zero, i.e., until CNTR has expired.

If neither RAKE demodulator 30 nor equalizer demodulator 32 has been disabled, and that the counter (CNTR) has expired, demodulator selection module 34 computes, on every measurement period, a difference (DELTA) between the CQIs associated with RAKE demodulators 30 and equalizer demodulator 32. In other words, demodulator selection module 34 computes the difference DELTA between the CQI associated with the unselected demodulator ("CQIunselected") and the CQI associated with the selected demodulator ("CQIselected"), i.e., DELTA=CQIunselected−CQIselected. If DFRONTmode is equal to one, i.e., the demodulation module 26 is operating using equalizer demodulator 32, demodulator selection module 34 computes DELTA using the equation DELTA=CQIrake−CQIeq, where CQIrake and CQIeq are quantized CQI values associated with RAKE demodulator 30 and equalizer demodulator 32, respectively. Alternatively, if DFRONTmode is equal to zero, i.e., the demodulation module 26 is operating using RAKE demodulator 32, demodulator selection module 34 computes DELTA using the equation DELTA=CQIeq−CQIrake.

If the difference DELTA is greater than a positive maximum threshold (DELTAmax), demodulator selection module 34 sets DELTA equal to DELTAmax. DELTAmax may be a threshold value specified during configuration of WCD 14. DELTAmax may, for example, be specified to be an integer value between one and ten. If the difference DELTA is less than a negative minimum threshold (DELTAmin), demodulator selection module 34 sets DELTA equal to DELTAmin.

DELTAmin, like DELTAmax, may be a minimum threshold value specified during configuration of WCD 14. In one example, DELTAmin may be set equal to the negative of DELTAmax. As will be described in more detail, the computed DELTA values are summed together, thus allowing the threshold values DELTAmax and DELTAmin to be set to control the rate at which the accumulated difference increases or decreases.

Demodulator selection module 34 adds the computed difference value (DELTA) to obtain a total accumulated difference (ACCUM(n)) that tracks a running total of the differences between CQIs of the selected and unselected demodulators. In particular, if DELTA is positive, decoder selection module 46 adds DELTA to ACCUM, i.e., ACCUM(n)=ACCUM(n−1)+DELTA. If DELTA is negative, then the updated total difference ACCUM(n), i.e., the updated value of ACCUM after adding the computed DELTA, is multiplied by an update mode parameter (UPDATEmode). In this manner, the updated total difference ACCUM is computed using the equation ACCUM(n)=(ACCUM(n−1)+DELTA)*UPDATEmode. UPDATEmode is parameter may be set to equal either one or zero. As will be described below, the UPDATEmode parameter may be set in such a manner to control the switching mode in which demodulator selection module 34 operates.

If the total accumulated difference ACCUM(n) is less than a negative minimum threshold (−THRESH), demodulator selection module 34 sets the total accumulated difference ACCUM(n) equal to −THRESH. This ensures that the total accumulated difference ACCUM(n) does not become too negative, thereby preventing a switch from occurring for a long period of time. As described above, DELTA is a negative value when the CQI associated with the selected demodulator is larger than the CQI associated with the unselected demodulator. Thus, ACCUM(n) may become a large negative number if the CQI associated with the selected demodulator is better than the CQI associated with the unselected demodulator for a long period of time. If ACCUM(n) becomes too large, no switch would occur for a significant period of time even if the CQI associated with the unselected demodulator becomes better than the CQI associated with the selected demodulator. Therefore, demodulation module 26 would continue to operate using the demodulator that has the worst channel quality until the unselected demodulator has a better CQI for a significant period of time. Therefore, by controlling the maximum negative value of ACCUM(n), ensures that ACCUM(n) does not grow to be too large of a negative value.

If the total accumulated difference ACCUM(n) exceeds a maximum threshold (THRESH), demodulator selection module 34 switches from the currently selected demodulator to the other demodulator. In particular, demodulator selection module 34 asserts a switch signal (SWITCH), e.g., SWITCH is set equal to one. For example, if demodulation module 26 is currently outputting the demodulated data from RAKE demodulation module 30, demodulator selection module 34 switches to equalizer demodulator 32. Demodulator selection module 34 resets the total accumulated difference ACCUM(n) by setting ACCUM(n) equal to zero.

Demodulator selection module 34 also resets the counter by setting CNTR equal to CNTRmax. As described above, CNTR is used to control the frequency of switching between demodulators 30, 32. In particular, demodulator selection module 34 waits until CNTR is equal to zero before permitting another SWITCH signal to be asserted. In fact, demodulator selection module 34 may not even start to observe CQIs associated with demodulators 30, 32 until the counter has expired.

The numerous parameters of the algorithm described above may be set to configure demodulator selection module 34 to operate in accordance with one of the three demodulator switching modes described above. In particular, the threshold parameter THRESH provides control over how much the CQI associated with unselected demodulator must exceed the CQI associated with selected demodulator, and for how long, before demodulator selection module 34 switches demodulators. So do the parameters DELTAmax and DELTAmin, which specify the upper and lower bound, respectively, applied to the DELTA. Additionally, the UPDATEmode parameter provides control over how the accumulator is updated.

More specifically, the initial value of the CNTR may be set to zero and the threshold parameter THRESH may be set to zero to configure demodulator selection module 34 to switch to whichever demodulator has the higher CQI during a previous measurement period. As another example, the maximum value of the difference DELTAmax may be set to one and the UPDATEmode parameter may be set to zero to configure demodulator selection module 34 to switch demodulators if the CQI associated with the unselected demodulator exceeds the CQI of the selected demodulator for a consecutive number of measurement periods equal to THRESHOLD. As a further example, the maximum value of the difference DELTAmax may be set to a value greater than one and the UPDATEmode parameter may be set to one to configure demodulator selection module 34 to switch between demodulators when the accumulated differences between the CQIs associated with the two demodulators exceeds a threshold.

Although the techniques of this disclosure are described in the context of switching between RAKE demodulator 30 and equalizer demodulator 32, the techniques may be utilized to switch between other types of demodulators in wireless devices based on other modulation and multiple access techniques, such as TDMA, FDMA and GSM. Moreover, the techniques may be implemented to switch between any numbers of demodulators based on channel quality measurements over a period of time.

A number of other elements may also be included within WCD 14, but are not specifically illustrated in FIG. 2 for simplicity and ease of illustration. For example, WCD 14 may include one or more components for transmitting signals from WCD 14, including a transmitter and a modulator. Moreover, depiction of different features as modules is intended to highlight different functional aspects of WCD 14 and does not necessarily imply that such modules must be realized by separate hardware and/or software components. Rather, functionality associated with one or more modules may be integrated within common hardware or realized by separate hardware and/or software components, such as within a transceiver or a modem. Thus, the disclosure should not be limited to the example of WCD 14.

The various components illustrated in FIG. 2 may be realized in hardware, software, firmware, or any combination thereof. Some components may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. When implemented in software, the functionality ascribed to the systems and devices described in this disclosure may be embodied as instructions on a computer-readable medium, such as within a memory (not shown), which may comprise, for example, random access memory (RAM), read-only memory (ROM), non-volatile random access memory (NVRAM), electrically erasable programmable read-only memory (EEPROM), FLASH memory, magnetic or optical data storage media, or the like. The instructions are executed to support one or more aspects of the functionality described in this disclosure.

Figure 3:
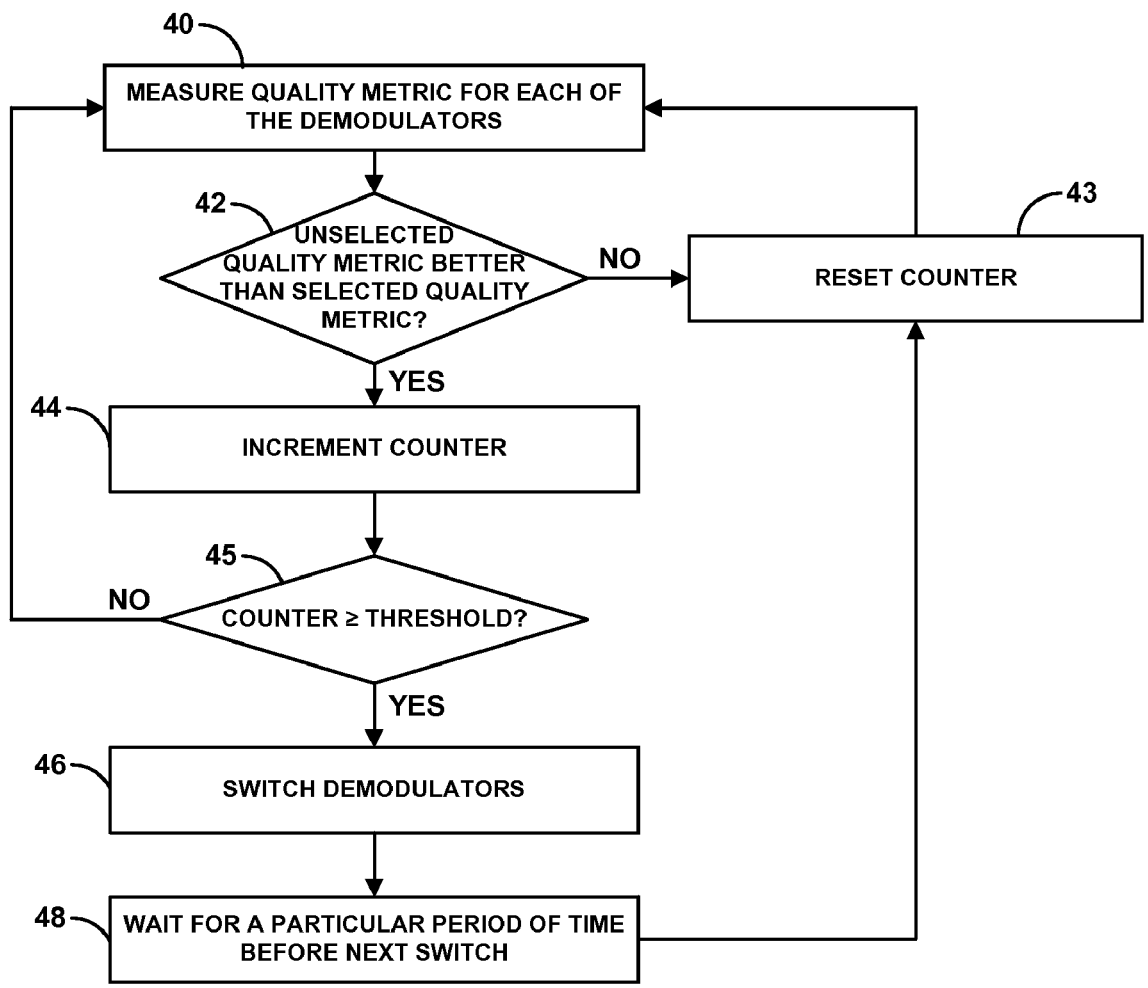
FIG. 3 is a flow diagram illustrating exemplary operation of a demodulation module dynamically switching between two or more demodulators based on a channel quality associated with each of the demodulators.

FIG. 3 is a flow diagram illustrating exemplary operation of demodulator selection module 34 dynamically switching between two or more demodulators based on quality metrics associated with each of the demodulators 30, 32. Initially, demodulators 30, 32 measure multiple quality metrics associated with each of demodulators 30, 32 (40). As described above, the quality metrics may be measurements of the channel quality associated with each of the demodulators and may measure signal strength of the channel, such as a signal-to-noise ration (SNR) or a received signal strength indicator (RSSI), for each of the demodulators. Alternatively, the quality metrics may measure some other performance characteristic such as throughput or data rate.

Demodulator selection module 34 compares the quality metrics associated with each of demodulators 30, 32 to determine whether the quality metrics associated with the unselected demodulator are better than the quality metrics associated with the selected demodulator (42). In other words, demodulator selection module 34 determines whether the quality metrics indicate that the unselected demodulator has the better performance characteristics. If the quality metrics associated with the unselected demodulator is not better than the quality metrics associated with the selected demodulator, i.e., the selected demodulator has a better channel quality, demodulator selection module 34 resets a counter that tracks the number of consecutive quality metrics that indicate the unselected demodulator had the better channel quality (43).

If the quality metrics associated with the unselected demodulator is better than the quality metrics associated with the selected demodulator, i.e., the unselected demodulator has better performance characteristics, demodulator selection module 34 increments the counter that tracks the number of consecutive quality metrics that indicate the unselected demodulator had the better performance characteristics (44). Demodulator selection module 34 then determines whether the counter is greater than or equal to a threshold (45). The threshold corresponds with the number of consecutive periods in which the quality metrics associated with the unselected demodulator must be better than the quality metrics associated with the selected demodulator in order to invoke a demodulator switch. In other words, the threshold represents the number of consecutive quality metrics that indicate the unselected demodulator has the better performance characteristics.

If the counter value is less than the threshold, demodulator selection module 34 does not switch demodulators and demodulation module 34 continues to measure the quality metrics associated with demodulators 30, 32. If the counter value is greater than or equal to the threshold, demodulator selection module 34 switches from the selected demodulator to the unselected demodulator (46). Demodulator selection module 34 may wait for a particular period of time before allowing another switch, i.e., a lockout period (48). Demodulator selection module 34 may, for example, initialize a counter and wait until the counter expires before switching demodulators again. In this manner, demodulator selection module 34 controls the frequency of switching between the demodulators. Moreover, demodulator selection module 34 may reset the counter that tracks the number of consecutive periods in which the unselected demodulator had the better performance characteristics.

Figure 4:
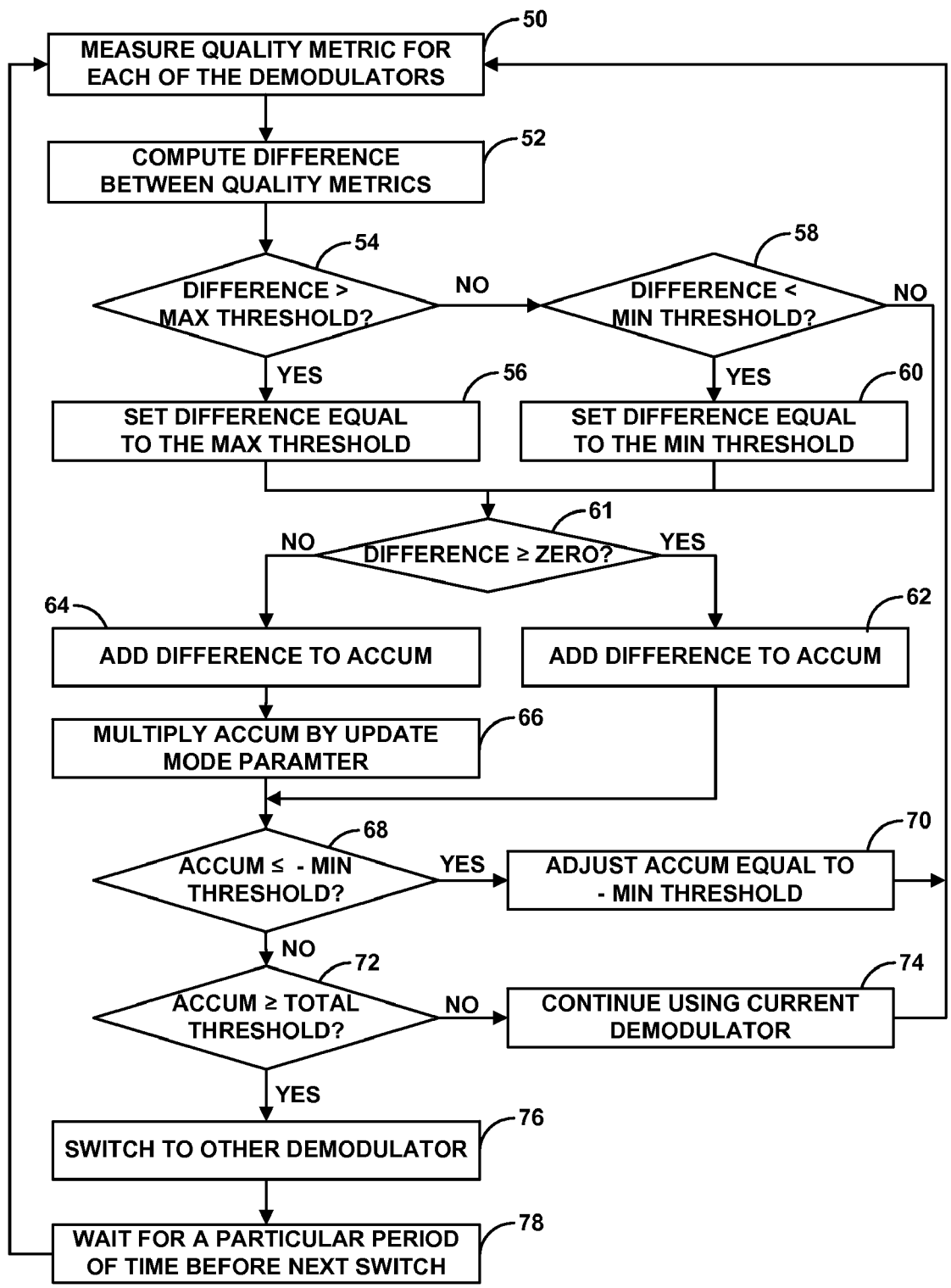
FIG. 4 is a flow diagram illustrating another exemplary operation of a demodulation module dynamically switching between two or more demodulators based on a channel quality associated with each of the demodulators.

FIG. 4 is a flow diagram illustrating exemplary operation of demodulator selection module 34 dynamically switching between two or more demodulators based on quality metrics associated with each of the demodulators. Initially, demodulators 30, 32 measures multiple quality metrics, such as channel quality indicators (CQIs), associated with each of demodulators 30, 32 (50). As described above, the CQI is a measurement of the channel quality associated with each of the demodulators and may measure signal strength of the channel, such as a signal-to-noise ration (SNR) or a received signal strength indicator (RSSI), for each of the demodulators. Alternatively, another one of the components of WCD 14 may measure the quality metrics and pass the measured quality metrics to demodulator selection module 34.

Demodulator selection module 34 computes a difference between the quality metrics associated with demodulators 30, 32 (52). For example, demodulator selection module 34 may compute a difference between one of the CQIs associated with the unselected demodulator and a corresponding one of the CQIs associated with the selected demodulator. Demodulator selection module 34 compares the computed difference to a maximum threshold (54). The maximum threshold may, for example, be a positive value specified during configuration of demodulation module 26. If the computed difference is greater than the maximum threshold, demodulator selection module 34 sets the difference equal to the maximum threshold (56).

If the difference is less than the maximum threshold, demodulator selection module 34 compares the computed difference to a minimum threshold (58). The minimum threshold may be a negative value specified during configuration of demodulation module 26. In one example, the minimum threshold may be equal to the negative of the maximum threshold. If the computed difference is less than the minimum threshold, demodulator selection module 34 sets the difference equal to the minimum threshold (60). Because the computed difference used to determine a total accumulated difference, as will be described in detail below, the maximum and minimum difference threshold values may be set to control the rate at which the accumulated difference increases or decreases.

Demodulator selection module 34 determines whether the adjusted difference is greater than or equal to zero (61). If the adjusted difference is greater than or equal to zero, demodulator selection module 34 adds the adjusted difference to the total accumulated difference (accum) that tracks a running total of the computed differences (62). If the adjusted difference is less than zero, demodulator selection module 34 adds the adjusted difference to the total accumulated difference (accum) (64) and then multiplies the updated total accumulated difference by an update mode parameter (66). As will be described below, the update mode parameter may be set to control a switching mode of demodulation selection module 34. For example, the update mode parameter may be either equal to one or zero.

Demodulator selection module 34 determines whether the total accumulated difference (accum) is less than or equal to a minimum accumulation threshold (68). If the total accumulated difference is less than or equal to the minimum accumulation threshold, demodulator selection module 34 adjusts the total accumulated difference to equal the minimum accumulation threshold (70). In this manner, demodulator selection module 34 limits how negative the total accumulated difference may become, thereby ensuring that demodulator selection module 34 will make switching decisions based on a recent history of CQIs.

If the total accumulated difference is greater than the minimum accumulation threshold, demodulator selection module 34 determines whether the total accumulated difference (accum) is greater than or equal to a maximum accumulation threshold (72). A total accumulated difference that exceeds the maximum accumulation threshold indicates that the switching requirements have been met. For example, it may indicate that analysis of the CQIs associated with the demodulators indicates that the unselected demodulator has a better channel quality than the selected demodulator for a consecutive number of measurement periods. Alternatively, it may indicate that the total accumulated differences between the CQIs has exceeded a threshold.

If the total accumulated difference is less than the maximum accumulation threshold, demodulator selection module 34 does not switch demodulators and demodulation module 34 continues to operate using the selected demodulator (74). If the total accumulated difference is greater than or equal to the maximum accumulation threshold, demodulator selection module 34 switches from the selected demodulator to the unselected demodulator (76). If we are currently using RAKE demodulator 30 and the total accumulated difference exceeds the maximum accumulation threshold, demodulator selection module 34 may switch to equalizer demodulator 32. In this manner, the switch signal may be asserted based on a channel quality history over a period of multiple channel quality measurements.

When demodulator selection module 34 switches between demodulators, demodulator selection module 34 may wait for a particular period of time, e.g., one more measurement periods, before allowing another switch (78). Demodulator selection module 34 may, for example, initialize a counter and wait until the counter expires before switching demodulators again. In this manner, demodulator selection module 34 controls the frequency of switching between the demodulators.

As described above, one or more parameters used in the demodulator selection algorithm may be adjusted to configure demodulator selection module 34 to operate in different demodulator switching modes. For example, the total threshold, maximum difference threshold and the minimum difference threshold may be adjusted to control how much and for how long the CQI associated with the unselected demodulator must exceed the CQI associated with the selected demodulator before a switch occurs. Moreover, the update mode parameter may be adjusted to control how the accumulator is updated. For example, the update mode parameter may be set to determine whether to switch demodulator modes after a number of consecutive differences exceed the threshold or after the total difference exceeds the threshold.

By setting the aforementioned maximum difference threshold, minimum difference threshold, update mode parameter, and total threshold, demodulator selection module 34 may be configured to behave in any one of a plurality of demodulator switching modes. As a first example, the initial value of the count down counter may be set to zero and the total threshold may be set to zero to configure demodulator selection module 34 to select whichever demodulator has the higher CQI on each measurement period. As another example, the maximum value of the difference may be set to one and the update mode parameter may be set to zero to configure demodulator selection module 34 to switch demodulators if the CQI associated with the unselected demodulator exceeds the CQI of the selected demodulator for a consecutive number of measurement periods equal to the threshold. As a further example, the maximum value of the difference may be set to a value greater than one and the update mode parameter may be set to one to configure demodulator selection module 34 to switch between demodulators when the accumulated differences between the CQIs associated with the two demodulators exceeds a threshold.

Figure 5:
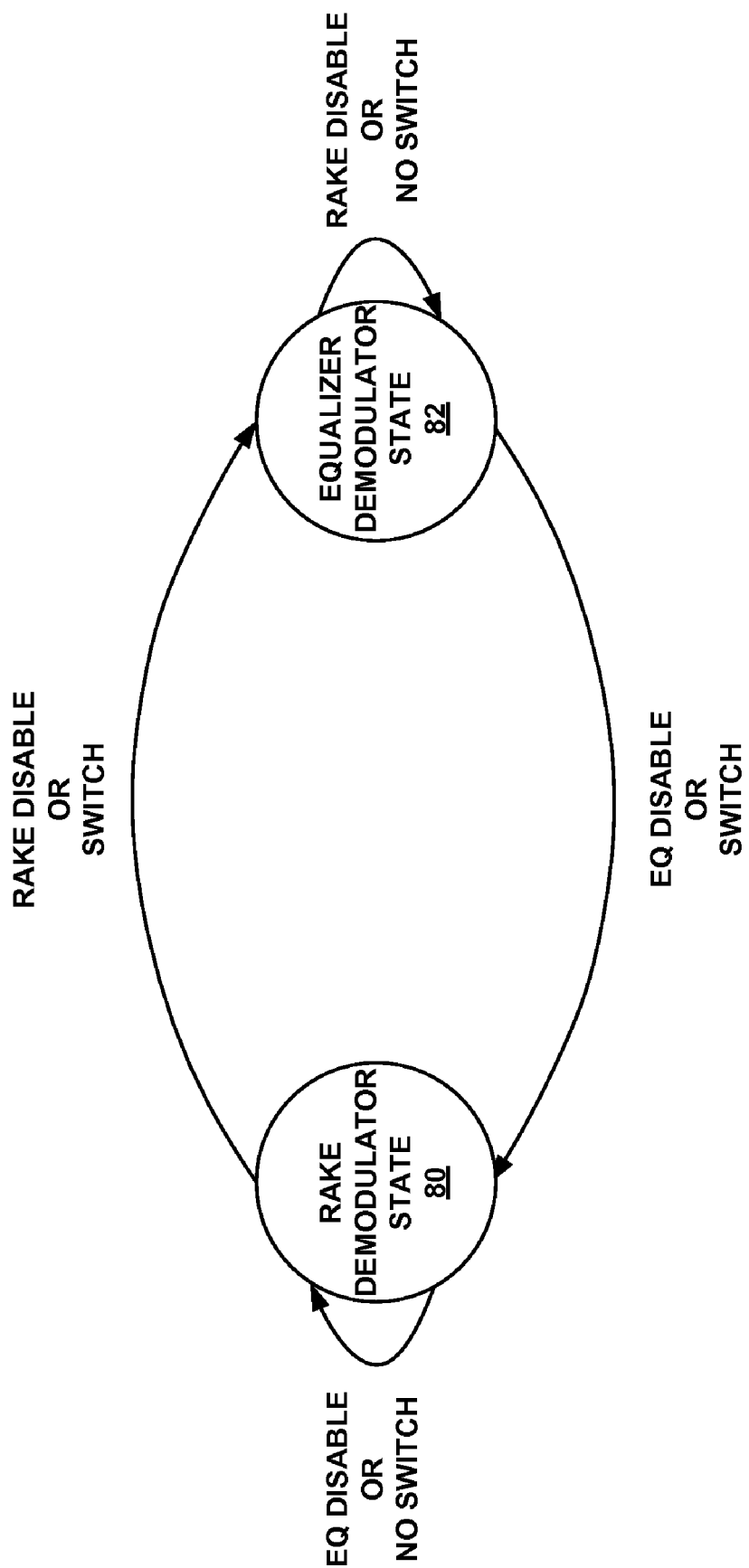
FIG. 5 is an exemplary state diagram illustrating dynamic switching techniques described in this disclosure.

FIG. 5 is an exemplary state diagram illustrating the dynamic switching techniques described in this disclosure. Demodulation module 26 initially begins in a RAKE demodulator state 80. In the RAKE demodulator state, demodulation module 26 demodulates received signals using RAKE demodulator 30. Demodulation module 26 remains in the RAKE demodulator state 80 until either a RAKEdisable signal or a SWITCH signal is asserted and no EQdisable signal is asserted. As described above, a RAKEdisable signal is typically asserted to test operation of equalizer demodulator 32. Additionally, demodulation module 26 may assert a SWITCH signal based on a channel quality associated with each of the demodulators. The requirements for asserting a SWITCH signal depend on the demodulator switching mode that demodulation module 26 is operating in. If operating in a demodulator switching mode that monitors channel quality over a plurality of measurement periods, demodulation module 26 may assert a switch signal to transition to equalizer demodulation state 82 whenever equalizer demodulator 32 observes better channel quality for a number of consecutive measurement periods or whenever the accumulated differences between the CQIs associated with the two demodulators 30, 32 exceeds a threshold. Alternatively, demodulation module may assert the SWITCH signal based on the best CQI during the last measurement period when operating in the switching mode that monitors channel quality of only a single measurement period.

Demodulation module 26 remains in the equalizer demodulator state 82 until either an EQdisable signal or a SWITCH signal is asserted without a RAKEdisable signal being asserted. As described above, an EQdisable signal may be asserted, for example, to ensure that RAKE demodulator 30 is used during compressed mode. Additionally, demodulation module 26 may assert the SWITCH signal based on a channel quality associated with each of the demodulators. Again, the requirements for asserting a SWITCH signal depend on the demodulator switching mode that demodulation module 26 is operating in. If operating in a demodulator switching mode that monitors channel quality over a plurality of measurement periods, demodulation module 26 may assert a switch signal to transition back to RAKE demodulation state 82 whenever RAKE demodulator 30 observes better channel quality for a number of consecutive measurement periods or whenever the accumulated differences between the CQIs associated with the two demodulators exceeds a threshold. Alternatively, demodulation module 26 may assert the SWITCH signal based on the best CQI during the last measurement period when operating in the switching mode that monitors channel quality of only a single measurement period.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects of this disclosure have been described. These and other aspects are within the scope of the following claims.

The invention claimed is:

1. A method comprising:
using an antenna for receiving incoming signals;
analyzing multiple quality metrics associated with each of a plurality of demodulators to determine which of the demodulators is operating with better performance characteristics;
selecting the one of the demodulators that is operating with better performance characteristics for a predetermined consecutive number of quality metrics; and
demodulating the incoming signals with the selected demodulator, wherein analyzing the multiple quality metrics comprises:
incrementing a counter when one of the quality metrics associated with a second demodulator indicates better performance characteristics for the second demodulator than the corresponding one of the quality metrics associated with a first demodulator.

2. The method of claim 1, wherein analyzing the multiple quality metrics associated with each of the plurality of demodulators comprises analyzing multiple types of quality metrics associated with each of the plurality of demodulators to determine which of the demodulators is operating with better performance characteristics.

3. The method of claim 2, further comprising associating a weight with each of the different types of quality metrics to produce a weighted average of the quality metrics.

4. The method of claim 1, wherein analyzing the multiple quality metrics associated with each of the plurality of demodulators comprises analyzing multiple samples of at least one type of quality metric taken at different times to determine which of the demodulators is operating with better performance characteristics.

5. The method of claim 1, wherein:
analyzing multiple quality metrics associated with each of a plurality of demodulators comprises analyzing multiple channel quality metrics associated with each of a plurality of demodulators to determine which of the demodulators has a better channel quality; and
selecting one of the demodulators comprises selecting the one of the demodulators that has the better channel quality.

6. The method of claim 1, further comprising:
switching demodulators in accordance with the selection; and
waiting for a period of time after switching to the selected demodulator before allowing another switch from the selected demodulator.

7. The method of claim 1, further comprising selecting among the demodulators based on analysis of one of the quality metrics associated with each of the demodulators.

8. The method of claim 1, further comprising measuring the quality metrics associated with the demodulators.

9. The method of claim 1, wherein analyzing the quality metrics comprises analyzing one or more of Signal-to-Noise Ratios (SNRs), Received Signal Strength Indicators (RSSIs), Carrier-to-Interference plus noise Ratios (CINRs), Channel Quality Indicator (CQIs), Bit Error Rates (BERs), Block Level Error Rates (BLERs), and bitrate.

10. The method of claim 1, wherein the demodulators comprise two or more of a RAKE demodulator, a Zero Forcing Equalizer (ZFE) and a Linear Minimum Mean Square Error Equalizer (LMMSE).

11. The method of claim 1, wherein analyzing multiple quality metrics associated with each of a plurality of demodulators comprises analyzing multiple quality metrics associated with each of a plurality of demodulators in real time to determine which of the demodulators is operating with better performance characteristics.

12. A method comprising:
using an antenna for receiving incoming signals;
analyzing multiple quality metrics associated with each of a plurality of demodulators to determine which of the demodulators is operating with better performance characteristics;
selecting the one of the demodulators that is operating with better performance characteristics; and
demodulating the incoming signals with the selected demodulator,
wherein analyzing the multiple quality metrics comprises:
comparing each of the quality metrics associated with a first demodulator with corresponding ones of the quality metrics associated with a second demodulator;
incrementing a counter when one of the quality metrics associated with the second demodulator indicates better performance characteristics for the second demodulator than the corresponding one of the quality metrics associated with first demodulator; and
selecting the second demodulator when the counter exceeds a threshold.

13. A method comprising:
using an antenna for receiving incoming signals;
analyzing multiple quality metrics associated with each of a plurality of demodulators to determine which of the demodulators is operating with better performance characteristics;
selecting the one of the demodulators that is operating with better performance characteristics;
demodulating the incoming signals with the selected demodulator;
computing differences between each of the quality metrics associated with a first demodulator and corresponding ones of the quality metrics associated with a second demodulator;
summing the computed differences over multiple samples of the metrics to obtain an accumulated quality metric difference; and
selecting the second demodulator when the accumulated quality metric difference exceeds a threshold.

14. The method of claim 13, further comprising:
comparing the accumulated quality metric difference to a minimum threshold; and
setting the accumulated quality metric difference equal to the minimum threshold when the accumulated quality metric difference is less than the minimum threshold.

15. The method of claim 13, further comprising:
comparing each of the computed differences to a maximum difference threshold; and
setting the computed differences that are greater than the maximum difference threshold equal to the maximum difference threshold.

16. The method of claim 13, further comprising:
comparing each of the computed differences to a negative minimum difference threshold; and
setting the computed differences that are less than the negative minimum difference threshold equal to the negative minimum difference threshold.

17. The method of claim 13, further comprising multiplying the accumulated quality metric difference by an update mode parameter that controls a demodulator selection mode for selecting between the demodulators.

18. A device comprising:
a plurality of demodulators; and
a demodulator selection module that analyzes multiple quality metrics associated with each of the plurality of demodulators to determine which of the demodulators is operating with better performance characteristics for a predetermined consecutive number of quality metrics and selects the one of the demodulators that is operating with better performance characteristics to demodulate incoming signals,
wherein the demodulator selection module increments a counter when one of the quality metrics associated with a second demodulator indicates better performance characteristics for the second demodulator than the corresponding one of the quality metrics associated with a first demodulator.

19. The device of claim 18, wherein the demodulator selection module analyzes multiple types of quality metrics associated with each of the plurality of demodulators to determine which of the demodulators is operating with better performance characteristics.

20. The device of claim 19, wherein the demodulator selection module associates a weight with each of the different types of quality metrics to produce a weighted average of the quality metrics for each of the demodulators.

21. The device of claim 18, wherein the demodulator selection module analyzes multiple samples of at least one type of quality metric taken at different times to determine which of the demodulators is operating with better performance characteristics.

22. The device of claim 18, wherein the demodulator selection module analyzes multiple channel quality metrics associated with each of a plurality of demodulators to determine which of the demodulators has a better channel quality and selects the one of the demodulators that has the better channel quality.

23. The device of claim 18, wherein the demodulator selection module switches demodulators in accordance with the selection and waits for a period of time after switching to the selected demodulator before allowing another switch from the selected demodulator.

24. The device of claim 18, wherein the demodulator selection module selects among the demodulators based on analysis of one of the quality metrics associated with each of the demodulators over a single sample.

25. The device of claim 18, wherein each of the demodulators measures the quality metrics associated with the demodulators.

26. The device of claim 18, wherein the quality metrics comprise one or more of Signal-to-Noise Ratios (SNRs), Received Signal Strength Indicators (RSSIs), Carrier-to-Interference plus noise Ratios (CINRs), Channel Quality Indicator (CQIs), Bit Error Rates (BERs), Block Level Error Rates (BLERs), and bitrate.

27. The device of claim 18, wherein the demodulators comprise two or more of a RAKE demodulator, a Zero Forcing Equalizer (ZFE) and a Linear Minimum Mean Square Error Equalizer (LMMSE).

28. The device of claim 18, wherein the demodulator selection module analyzes the multiple quality metrics associated with each of a plurality of demodulators in real time to determine which of the demodulators is operating with better performance characteristics.

29. The device of claim 18, wherein the device comprises a wireless communication device.

30. A device comprising:
a plurality of demodulators; and
a demodulator selection module that analyzes multiple quality metrics associated with each of the plurality of demodulators to determine which of the demodulators is operating with better performance characteristics and selects the one of the demodulators that is operating with better performance characteristics to demodulate incoming signals;
wherein the demodulator selection module compares each of the quality metrics associated with a first one of the demodulators with corresponding ones of the quality metrics associated with a second one of the demodulators, increments a counter when one of the quality metrics associated with the second demodulator indicates better performance characteristics for the second demodulator than the corresponding one of the quality metrics associated with first demodulator, and selects the second demodulator when the counter exceeds a threshold.

31. A device comprising:
a plurality of demodulators; and
a demodulator selection module that analyzes multiple quality metrics associated with each of the plurality of demodulators to determine which of the demodulators is operating with better performance characteristics and selects the one of the demodulators that is operating with better performance characteristics to demodulate incoming signals;
wherein the demodulator selection module computes differences between each of the quality metrics associated with a first one of the demodulators and corresponding ones of the quality metrics associated with a second one of the demodulators, sums the computed differences over multiple samples of the metrics to obtain an accumulated quality metric difference, and selects the second demodulator when the accumulated quality metric difference exceeds a threshold.

32. The device of claim 31, wherein the demodulator selection module compares the accumulated quality metric difference to a minimum threshold and sets the accumulated quality metric difference equal to the minimum threshold when the accumulated quality metric difference is less than the minimum threshold.

33. The device of claim 31, wherein the demodulator selection module compares each of the computed differences to a maximum difference threshold and sets the computed differences that are greater than the maximum difference threshold equal to the maximum difference threshold.

34. The device of claim 31, wherein the demodulator selection module compares each of the computed differences to a negative minimum difference threshold and sets the computed differences that are less than the negative minimum difference threshold equal to the negative minimum difference threshold.

35. The device of claim 31, wherein the demodulator selection module multiplies the accumulated quality metric difference by an update mode parameter that controls a demodulator selection mode for selecting between the demodulators.

36. A computer program product comprising:
a non-transitory computer-readable medium comprising codes for causing at least one computer to:
analyze multiple quality metrics associated with each of a plurality of demodulators to determine which of the demodulators is operating with better performance characteristics;
select the one of the demodulators that is operating with better performance characteristics for a predetermined consecutive number of quality metrics; and
demodulate incoming signals with the selected demodulator,
wherein the codes for causing the computer to analyze the quality metrics comprises codes for causing the computer to:
increment a counter when one of the quality metrics associated with a second demodulator indicates better performance characteristics for the second demodulator than the corresponding one of the quality metrics associated with a first demodulator.

37. The computer program product of claim 36, wherein the codes for causing the computer to analyze the multiple quality metrics associated with each of the plurality of demodulators further comprises codes for causing the computer to analyze multiple types of quality metrics associated with each of the plurality of demodulators to determine which of the demodulators is operating with better performance characteristics.

38. The computer program product of claim 37, further comprising codes for causing the computer to associate a weight with each of the different types of quality metrics to produce a weighted average of the quality metrics.

39. The computer program product of claim 36, wherein the codes for causing the computer to analyze the multiple quality metrics associated with each of the plurality of demodulators further comprises codes for causing the computer to analyze multiple samples of at least one type of quality metric taken at different times to determine which of the demodulators is operating with better performance characteristics.

40. The computer program product of claim 36, further comprising codes for causing the computer to:
switch demodulators in accordance with the selection; and
wait for a period of time after switching to the selected demodulator before allowing another switch from the selected demodulator.

41. A computer program product comprising:
a non-transitory computer-readable medium comprising codes for causing at least one computer to:
analyze multiple quality metrics associated with each of a plurality of demodulators to determine which of the demodulators is operating with better performance characteristics;
select the one of the demodulators that is operating with better performance characteristics; and
demodulate incoming signals with the selected demodulator;
wherein the codes for causing the computer to analyze the quality metrics comprises codes for causing the computer to:
compare each of the quality metrics associated with a first demodulator with corresponding ones of the quality metrics associated with a second demodulator;
increment a counter when one of the quality metrics associated with the second demodulator indicates better performance characteristics for the second demodulator than the corresponding one of the quality metrics associated with first demodulator; and
select the second demodulator when the counter exceeds a threshold.

42. A computer program product comprising:
a non-transitory computer-readable medium comprising codes for causing at least one computer to:
analyze multiple quality metrics associated with each of a plurality of demodulators to determine which of the demodulators is operating with better performance characteristics;
select the one of the demodulators that is operating with better performance characteristics; and
demodulate incoming signals with the selected demodulator;
compute differences between each of the quality metrics associated with a first demodulator and corresponding ones of the quality metrics associated with a second demodulator;
sum the computed differences over multiple samples of the metrics to obtain an accumulated quality metric difference; and
select the second demodulator when the accumulated quality metric difference exceeds a threshold.

43. A device comprising:
using an antenna for receiving incoming signals;
means for analyzing multiple quality metrics associated with each of a plurality of demodulators to determine which of the demodulators is operating with better performance characteristics;
means for selecting the one of the demodulators that is operating with better performance characteristics for a predetermined consecutive number of quality metrics; and
means for demodulating the incoming signals with the selected demodulator,
wherein the means for analyzing increments a counter when one of the quality metrics associated with a second demodulator indicates better performance characteristics for the second demodulator than the corresponding one of the quality metrics associated with a first demodulator.

44. The device of claim 43, wherein the analyzing means analyze multiple types of quality metrics associated with each of the plurality of demodulators to determine which of the demodulators is operating with better performance characteristics.

45. The device of claim 44, wherein the analyzing means associate a weight with each of the different types of quality metrics to produce a weighted average of the quality metrics.

46. The device of claim 43, wherein the analyzing means analyze multiple samples of at least one type of quality metric taken at different times to determine which of the demodulators is operating with better performance characteristics.

47. A device comprising:
using an antenna for receiving incoming signals;
means for analyzing multiple quality metrics associated with each of a plurality of demodulators to determine which of the demodulators is operating with better performance characteristics;
means for selecting the one of the demodulators that is operating with better performance characteristics; and
means for demodulating the incoming signals with the selected demodulator;
wherein the means for analyzing compares each of the quality metrics associated with a first demodulator with corresponding ones of the quality metrics associated with a second demodulator and increments a counter when one of the quality metrics associated with the second demodulator indicates better performance characteristics for the second demodulator than the corresponding one of the quality metrics associated with first demodulator; and
the means for selecting selects the second demodulator when the counter exceeds a threshold.

48. A device comprising:
using an antenna for receiving incoming signals;
means for analyzing multiple quality metrics associated with each of a plurality of demodulators to determine which of the demodulators is operating with better performance characteristics;
means for selecting the one of the demodulators that is operating with better performance characteristics; and
means for demodulating the incoming signals with the selected demodulator;
wherein the means for analyzing computes differences between each of the quality metrics associated with a first demodulator and corresponding ones of the quality metrics associated with a second demodulator and sums the computed differences over multiple samples of the metrics to obtain an accumulated quality metric difference; and
the means for selecting selects the second demodulator when the accumulated quality metric difference exceeds a threshold.

49. The device of claim 43, further comprising means for switching demodulators in accordance with the selection, wherein the switching means waits for a period of time after switching to the selected demodulator before allowing another switch from the selected demodulator.

* * * * *